(12) United States Patent
Kojima et al.

(10) Patent No.: US 10,320,486 B1
(45) Date of Patent: Jun. 11, 2019

(54) OPTICAL SIGNAL TRANSMITTER AND OPTICAL SIGNAL ENCODER USING CONSTANT MODULUS FORMATS, AND METHOD FOR GENERATING MODULATION CODES

(71) Applicants: Mitsubishi Electric Research Laboratories, Inc., Cambridge, MA (US); Mitsubishi Electric Corporation, Chiyoda-Ku, Tokyo (JP)

(72) Inventors: Keisuke Kojima, Weston, MA (US); Tsuyoshi Yoshida, Tokyo (JP); Toshiaki Koike Akino, Belmont, MA (US); David Millar, Concord, MA (US); Kieran Parsons, Cambridge, MA (US)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/981,052

(22) Filed: May 16, 2018

Related U.S. Application Data

(60) Provisional application No. 62/638,476, filed on Mar. 5, 2018.

(51) Int. Cl.
*H04B 10/508* (2013.01)
*H04B 10/516* (2013.01)

(52) U.S. Cl.
CPC .................................. *H04B 10/516* (2013.01)

(58) Field of Classification Search
CPC . H04B 10/508; H04B 10/5161; H04B 10/516
See application file for complete search history.

(56) References Cited

U.S. PATENT DOCUMENTS 6,374,312 B1* 4/2002 Pearce .................. H04L 7/0029
710/23
9,491,026 B2 11/2016 Murakami et al.
9,749,058 B2 8/2017 Reimer et al.
(Continued)

FOREIGN PATENT DOCUMENTS

EP 2571217 A1 9/2011

*Primary Examiner* — Dzung D Tran
(74) *Attorney, Agent, or Firm* — Gennadiy Vinokur; James McAleenan; Masaru Taira

(57) ABSTRACT

An encoder for generating an optical data code from a symbol performs a symbol mapping and an encoding, wherein the symbol mapping performs providing a first constellation format having first and second amplitude rings with circular grids corresponding to phase angles, providing a second constellation format having the first and second amplitude rings with the circular grids corresponding to the phase angles, applying a first part of the symbol to one of the first and second constellation formats to represent the first part of the symbol by one of the first and second amplitude rings with one of the circular grids, and applying a second part of the symbol to another one of the first and second constellation formats to represent the second part of the symbol by one of the first and second amplitude rings with one of the circular grids. The first and the second constellation can be mapped to subcarrier modulation in three different ways.

21 Claims, 15 Drawing Sheets

(56) References Cited

U.S. PATENT DOCUMENTS

| | | | |
|---|---|---|---|
| 9,806,739 B1* | 10/2017 | Kojima | H03M 7/30 |
| 2002/0174242 A1* | 11/2002 | Hindie | H04L 27/34 |
| | | | 709/231 |
| 2014/0205286 A1 | 7/2014 | Ji et al. | |
| 2015/0271003 A1* | 9/2015 | Kuchi | H04L 27/2646 |
| | | | 370/329 |
| 2016/0261347 A1* | 9/2016 | Karar | H04B 10/6162 |
| 2016/0269215 A1* | 9/2016 | Choi | H04L 27/22 |
| 2016/0277083 A1* | 9/2016 | Koike-Akino | H04B 7/0456 |

\* cited by examiner

| X-pol. $(b_0b_1b_2,b_6)$ | $b_0$ $b_1$ $b_2$ | Gray mapped phase |
|---|---|---|
| | $b_6$ | Amplitude |
| Y-pol. $(b_3b_4b_5,b_7)$ | $b_3$ $b_4$ $b_5$ | Gray mapped phase |
| | $b_7$ | Amplitude |

$b_5=\text{XOR}(b_0,b_1,b_2)$, $b_7=\text{NOT}(b_6)$
$b_6=\text{XOR}(b_2,b_3,b_4)$

FIG. 3A

| X-pol. $(b_0b_1b_2,b_6)$ | $b_0$ $b_1$ $b_2$ | Gray mapped phase |
|---|---|---|
| | $b_6$ | Amplitude |
| Y-pol. $(b_3b_4b_5,b_7)$ | $b_3$ $b_4$ $b_5$ | Gray mapped phase |
| | $b_7$ | Amplitude |

$b_6=\text{XOR}(b_0,b_1,b_2,b_3,b_4,b_5)$, $b_7=\text{NOT}(b_6)$

FIG. 3B

| X-pol. $(b_0 b_1 b_2, b_3)$ | | | Y-pol. $(b_4 b_5 b_6, b_7)$ | | |
|---|---|---|---|---|---|
| Gray mapped phase | | Amplitude | Gray mapped phase | | Amplitude |
| $b_0$ $b_1$ $b_2$ | | $b_3$ | $b_4$ $b_5$ $b_6$ | | $b_7$ |

$b_7 = \text{NOT}(b_3)$

FIG. 3C

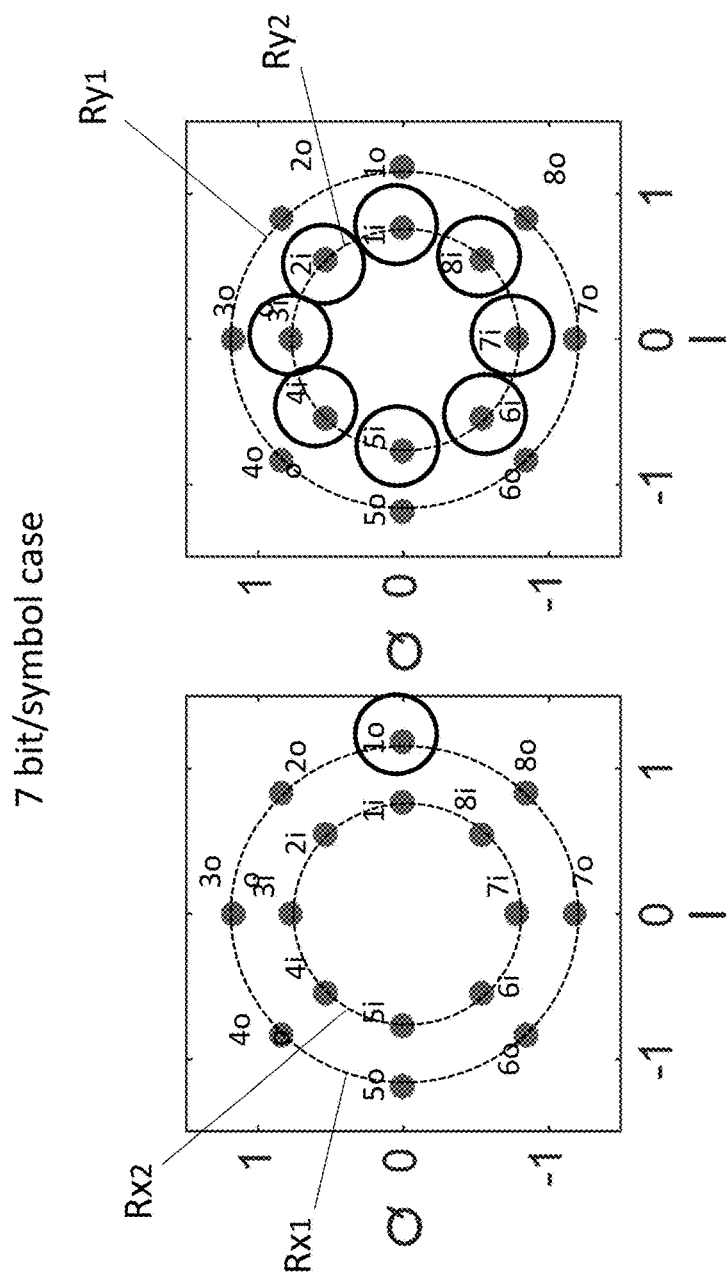

OPTICAL SIGNAL TRANSMITTER AND OPTICAL SIGNAL ENCODER USING CONSTANT MODULUS FORMATS, AND METHOD FOR GENERATING MODULATION CODES

FIELD OF THE INVENTION

This invention relates to an optical signal transmitter and optical signal encoder, and method for generating modulation codes, and more specifically, an optical signal transmitter and optical communication system for coherent optical communication using constant modulus formats, and method for arranging subcarriers using these constant modulus formats.

BACKGROUND OF THE INVENTION

Fiber nonlinearity is usually the limiting factor in determining the transmission distance of optical communications. One of the ways to mitigate fiber nonlinearity is to use multi-subcarrier (MSC) modulation. It has been theoretically and experimentally demonstrated that MSC modulation comprising of 2-4 GB subcarriers is the best in terms of nonlinearity tolerance. This is due to the fact that coherence among subcarriers decreases with narrower subcarriers.

Four-dimensional (4D) constant modulus modulation formats have also been shown to have nonlinearity tolerance compared to conventional modulation formats in the conventional 31-34 GBd wavelength domain multiplexed (WDM) channels.

In this invention, we apply 4D constant modulus formats to MCS. Mapping 4D constant modulus signal comprising two complementary amplitude signals onto dual polarization optical signal has multiple options. The pair can be mapped across two polarizations of the same time slot, across the two time slots of the same polarization, or across two subcarriers of the same time slot and the same polarization. In particular, in the case of MSC, the third option becomes a viable option, since they can be generated from a single transmitter. On the other hand, conventional single carrier transmitter cannot offer this option.

SUMMARY OF THE INVENTION

Some embodiments are based on the recognition that an optical encoder for generating an optical data code from a symbol. For example, an encoder for generating an optical data code from a symbol includes a processor to perform a symbol mapping program and an encoding program; a memory, in connection with the processor, to store the symbol mapping and encoding programs, wherein the symbol mapping program causes the processor to perform: providing a first constellation format having first and second amplitude rings with circular grids corresponding to phase angles; providing a second constellation format having the first and second amplitude rings with the circular grids corresponding to the phase angles; applying a first part of the symbol to one of the first and second constellation formats to represent the first part of the symbol by one of the first and second amplitude rings with one of the circular grids; applying a second part of the symbol to another one of the first and second constellation formats to represent the second part of the symbol by one of the first and second amplitude rings with one of the circular grids; and providing pairs of superchannels arranged according to time slots, wherein each of the superchannels includes subcarriers allocated to subchannel numbers, wherein the first and second parts of the symbol are allocated to a pair of the subcarriers, wherein a sum of powers of the pair of the subcarriers is chosen so as to become approximately a predetermined value, wherein each of the superchannels is uniformly divided by the subcarriers corresponding to subcarrier symbol rates, and wherein the encode program causes the processor to perform: encoding the first part of the symbol into a first subset of the optical data code using the one of the first and second amplitude rings with the one of the circular grids according to the one of the first and second constellation formats; and encoding the second part of the symbol into a second subset of the optical data code using the one of the first and second amplitude rings with the one of the circular grids according to the other one of the first and second constellation formats.

Further, some embodiments of the present invention disclose an optical transmitter. The optical transmitter includes an encoder device configured to generate and transmit first and second modulation signals. The encoder device includes a processor to perform a symbol mapping program and an encoding program; a memory, in connection with the processor, to store the symbol mapping and encoding programs, wherein the symbol mapping program causes the processor to perform: providing a first constellation format having first and second amplitude rings with circular grids corresponding to phase angles; providing a second constellation format having the first and second amplitude rings with the circular grids corresponding to the phase angles; applying a first part of the symbol to one of the first and second constellation formats to represent the first part of the symbol by one of the first and second amplitude rings with one of the circular grids; applying a second part of the symbol to another one of the first and second constellation formats to represent the second part of the symbol by one of the first and second amplitude rings with one of the circular grids; and providing pairs of superchannels arranged according to time slots, wherein each of the superchannels includes subcarriers allocated to subchannel numbers, wherein the first and second parts of the symbol are allocated to a pair of the subcarriers, wherein a sum of powers of the pair of the subcarriers is chosen so as to become approximately a predetermined value, wherein each of the superchannels is uniformly divided by the subcarriers corresponding to subcarrier symbol rates, and wherein the encode program causes the processor to perform: encoding the first part of the symbol into a first subset of the optical data code using the one of the first and second amplitude rings with the one of the circular grids according to the one of the first and second constellation formats; and encoding the second part of the symbol into a second subset of the optical data code using the one of the first and second amplitude rings with the one of the circular grids according to the other one of the first and second constellation formats; a continuous wave (CW) optical source configured to transmit a CW optical signal; a polarization beam splitter configured to split the CW optical signal of the CW optical source into first and second parts of the CW optical signal; a first modulator connected to the encoder device, wherein the first modulator receives and modulates the first part of the CW optical signal to generate a first modulated optical carrier signal according to the first modulation signal; a second modulator connected to the encoder device, wherein the second modulator receives and modulates the second part of the CW optical signal to generate a second modulated optical carrier signal according to the second modulation signal; and a beam combiner configured to combine the first and second modulated optical carrier signals to generate and transmit a modulated optical carrier signal.

Another embodiment is based on recognition that a symbol mapping method for generating optical data from a symbol using a processor in communication with a memory. The symbol mapping method includes steps of providing a first constellation format having first and second amplitude rings with circular grids corresponding to predetermined phase angles; providing a second constellation format having the first and second amplitude rings with the circular grids corresponding to the predetermined phase angles; applying a first part of the symbol to one of the first and second constellation formats to represent the first part of the symbol by one of the first and second amplitude rings with one of the circular grids; applying a second part of the symbol to another one of the first and second constellation formats to represent the second part of the symbol by one of the first and second amplitude rings with one of the circular grids; and providing pairs of superchannels arranged according to time slots, wherein each of the superchannels includes a number of subcarriers allocated to subchannel numbers, wherein each of the superchannels is uniformly divided by the subcarriers corresponding to subcarrier symbol rates, wherein the first and second parts of the symbol are allocated to a pair of the subcarriers, wherein a sum of powers of the pair of the subcarriers is chosen so as to become approximately a predetermined value.

BRIEF DESCRIPTION OF THE DRAWINGS

FIG. 3A shows a summary of a mapping rule of the 5-bits/symbol modulation format, according to embodiments of the present invention;

FIG. 3B shows a summary of a mapping rule of the 6-bits/symbol modulation format, according to embodiments of the present invention;

FIG. 3C shows a summary of a mapping rule of the 7-bits/symbol modulation format, according to embodiments of the present invention;

FIG. 6A and FIG. 6B show an example of the 7 bits/symbol modulation format according to embodiments of the invention;

DETAILED DESCRIPTION OF THE PREFERRED EMBODIMENTS

Figure 1A:
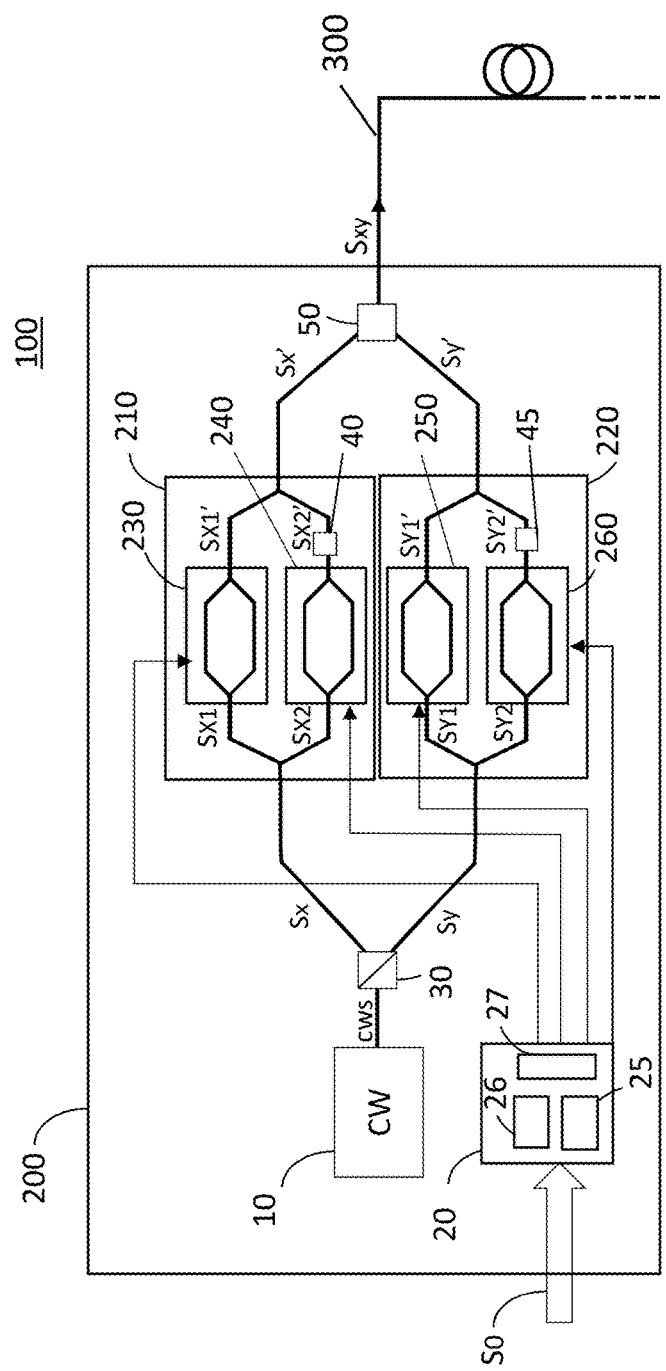
FIG. 1A shows an optical communication 100 including an optical signal transmitter 200, according to embodiments of the invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

For removing fiber non linearity in optical communication systems, multi-subcarrier modulation (MSC) can be used. The MSC comprises of 2-4 GB subcarriers for mitigating effects of fiber non linearity. Also, a modulation technique such as Four-dimensional (4D) constant modulus modulation formats can provide non-linenearity tolerance compared to previous modulation formats, and mapping 4D constant modulus signal onto dual polarization optical signal has multiple options.

Some embodiments according to the present invention disclose in the following that mapping options of 4D constant modulation formats in terms of pairing complementary amplitude signals in the context of MSC. Each symbol of the 4D constant modulus modulation can be arranged into one time slot, e.g. two polarization or two time slots for each polarization. The 4D signals can be mapped to X- and Y-polarization in one time slot. Also, 4D signal can be mapped onto two time slots, or two neighboring subcarriers.

FIG. 1A shows an optical communication system 100 including an optical signal transmitter 200, according to some embodiments of the invention. An optical fiber 300 connected to the optical signal transmitter 200 that transmits optical signals through the optical fiber 300, as indicated in the figure.

The optical signal transmitter 200 includes a continuous wave optical carrier source 10 (CW 10) such as a laser diode, an encoder device 20, a polarization beam splitter 30, an x-polarization modulator 210, a y-polarization modulator 220 and a polarization beam combiner 50.

The x-polarization modulator 210 includes a first modulator 230, a second modulator 240, waveguides Sx, Sx1, Sx1', Sx2, Sx2' and Sx' and a π/2 phase-shifter 40 arranged in the waveguide Sx2'.

The y-polarization modulator 220 includes a third modulator 250, a fourth modulator 260, and waveguides Sy, Sy1, Sy1', Sy2, Sy2' Sy' and π/2 filter 45 arranged in the waveguide Sy2'.

The first, second, third and fourth modulators 230, 240, 250 and 260 may be constructed from Mach-Zenhder interferometers, variable optical attenuators, phase modulators, etc.

The encoder device 20 includes an error correction circuit 25, an encoding circuit 26 and a driver circuit 27, a memory (not shown) connected to a processor (not shown) and an input/output (I/O) part (not shown) connectable with a data storage device or data communication cable outside of the encoder device 20. When an encoding format of the encoder device 20 needs to be changed to a new encoding format, a new program may be introduced to the encoder device 20 via the I/O part so that the encoding format of the encoder device 20 for the optical signal modulation is renewed and the optical transmitter 200 transmits an optical carrier signal modulated according to the new encoding format. The I/O part and memory may be disposed in the optical transmitter 200 separately from the encoder device 20.

When receiving a data set via a data bus S0, the encoder device 20 performs data processing for generating an encoded data set with predetermined error correction according to a predetermined modulation format scheme using the error correction circuit 25 and the encoding circuit 26. Successively, the driver circuit 27 transmits modulation driver signals of the encoded data set to the first modulator 230, the second modulator 240, the fourth modulator 250 and the fifth modulator 260, respectively. In this case, the predetermined modulation format scheme may be a 5 bits/symbol modulation format, a 6 bits/symbol modulation format, a 7 bits/symbol modulation format, or a time hybrid 4-dimensional modulation format based on 4D-2A8PSK Modulation Format Scheme according to some embodiments of the invention.

Encoding formats used in the encoder device 20 including the five bit-symbol modulation format, the six bit-symbol modulation format, the seven bit-symbol modulation format, and the time hybrid 4-dimensional modulation format based on the 4D-2A8PSK Modulation Format Scheme will be provided in the following sections.

The CW 10 generates and transmits an optical carrier to the polarization beam splitter 30 via a waveguide CWS connecting the CW and the polarization beam splitter 30. The polarization beam splitter 30 sprits the optical carrier into an X-polarization carrier and a Y-polarization carrier.

The X-polarization carrier is guided through the waveguide Sx and separated into a first X-polarization carrier and a second X-polarization carrier via the waveguides Sx1 and Sx2. The first X-polarization carrier is introduced to the first modulator 230 and the second X-polarization carrier is introduced to the second modulator 240 via the waveguides Sx1 and Sx2. The first X-polarization carrier is modulated by the first modulator 230 and the second X-polarization carrier is modulated by the second modulator 240 according to the modulation driver signals supplied from the driver circuit 27 of the encoder device 20, resulting a modulated first X-polarization carrier and a modulated second X-polarization carrier.

In this case, an amplitude of the modulated first X-polarization carrier and an amplitude of the modulated second X-polarization carrier are arranged to be different according to the modulation driver signals from the encoder device 20. For instance, when the amplitude of the modulated first X-polarization carrier is smaller than a predetermined amplitude, then the amplitude of the modulated second X-polarization carrier is greater than the predetermined amplitude. This process makes it possible to generate an approximately constant power for a sum of the modulated first X-polarization carrier and the modulated second X-polarization carrier.

After passing through the π/2 filter 40, the modulated second X-polarization carrier merges with the modulated first X-polarization carrier, resulting a merged modulated X-polarization carrier.

The Y-polarization carrier is guided through the waveguide Sy and separated into a first Y-polarization carrier and a second Y-polarization carrier via the waveguides Sy1 and Sy2. The first Y-polarization carrier is introduced to the third modulator 250 and the second Y-polarization carrier is introduced to the fourth modulator 260 via the waveguides Sy1 and Sy2, respectively. The first Y-polarization carrier is modulated by the third modulator 250 and the second Y-polarization carrier is modulated by the fourth modulator 260 according to the modulation driver signals supplied from the driver circuit 27 of the encoder device 20, resulting a modulated first Y-polarization carrier and a modulated second Y-polarization carrier.

In this case, an amplitude of the modulated first Y-polarization carrier and an amplitude of the modulated second Y-polarization carrier are arranged to be different according to the modulation driver signals from the encoder device 20. For instance, when the amplitude of the modulated first Y-polarization carrier is smaller than the predetermined amplitude, then the amplitude of the modulated second Y-polarization carrier is greater than the predetermined amplitude.

This process makes it possible to generate an approximately constant power for a sum of the modulated first Y-polarization carrier and the modulated second Y-polarization carrier.

After passing through the π/2 filter 45, the modulated second Y-polarization carrier merges with the modulated first Y-polarization carrier, resulting a merged modulated Y-polarization carrier.

The merged modulated X-polarization carrier and the merged modulated Y-polarization carrier are combined at the polarization beam combiner 50, resulting an optical carrier signal. The optical carrier signal propagates via the optical fiber 300.

According to embodiments of the present invention, the sum of the modulated first X-polarization carrier and the modulated second X-polarization carrier can be an approximately constant power and the sum of the modulated first Y-polarization carrier and the modulated second Y-polarization carrier can be an approximately constant power, the optical carrier signal transmitted from the optical signal transmitter 200 becomes an approximately constant power. This can be substantial advantages for coherent optical communication systems, because potential nonlinear effect while propagating in the optical fiber is avoidable.

4D-2A8PSK Modulation Format Scheme

Figure 1B:
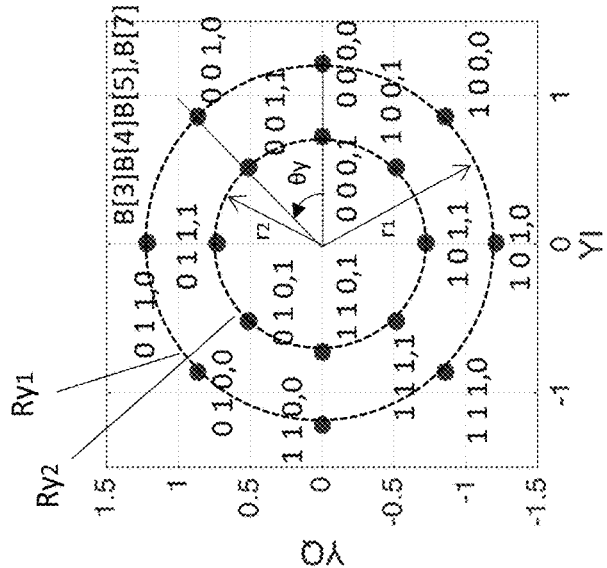
FIG. 1B shows a first constellation of a 4D-2A8PSK modulation format, according to embodiments of the invention.
Figure 1C:
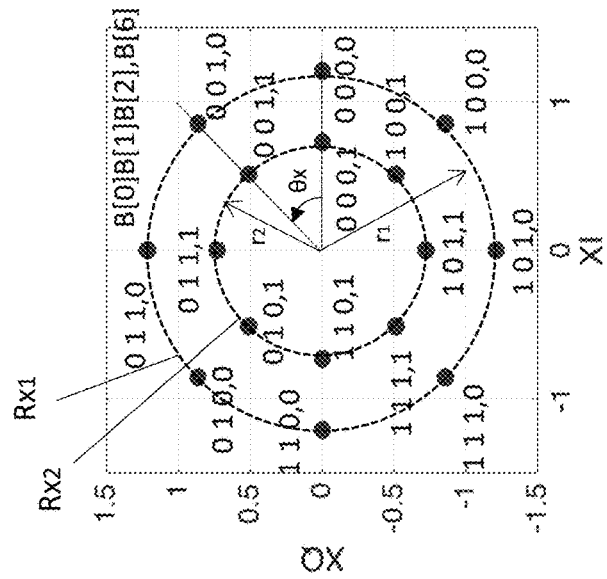
FIG. 1C shows a second constellation of a 4D-2A8PSK modulation format, according to embodiments of the invention.

FIG. 1B and FIG. 1C show constellations of a 4D-2A8PSK modulation format. The constellations include two constellations, which can be arranged in various ways.

FIG. 1B is the first constellation that includes an XI axis indicating the in-phase component of one polarization and an XQ axis indicating the quadrature component of the same polarization, which can be either X- or Y-polarization. The first constellation includes first and second amplitude rings Rx1 and Rx2 with first and second amplitude radii r1 and r2 indicating amplitude values. The first and second amplitude rings Rx1 and Rx2 form circular grids determined by phase angles θx as indicated in FIG. 1B. Each of the circular grids on the first and second amplitude rings Rx1 and Rx2 is assigned three bits as a form of {B[0] B[1] B[2]} and one parity bit B[6]. The three bits {B[0] B[1] B[2]} range from {0 0 0} to {1 1 1} and the parity bit B[6] varies between "0" and "1."

FIG. 1C is the second constellation that includes an YI axis indicating the in-phase component of one polarization and an YQ axis indicating the quadrature component of the same polarization, which can be either X- or Y-polarization. The second constellation includes first and second amplitude rings Ry1 and Ry2 with the first and second amplitude radii r1 and r2 indicating amplitude values. The first and second amplitude rings Ry1 and Ry2 form circular grids determined by phase angles θy as indicated in FIG. 1C. Each of the circular grids on the first and second amplitude rings Ry1 and Ry2 is assigned three bits as a form of {B[3] B[4] B[5]} and one parity bit B[7]. The three bit {B[3] B[4] B[5]} ranges from {0 0 0} to {1 1 1} and the parity bit B[6] varies between "0" and "1."

4D-2A8PSK Modulation Format Mapping Types

Subcarrier modulation is the case where modulation signal consists of multiple subcarriers. This multiplexing can be done either in the digital domain, or in an RF domain. When applied to coherent optical modulation, subcarriers of X- and Y-polarizations are usually modulated independently.

Figure 2A:
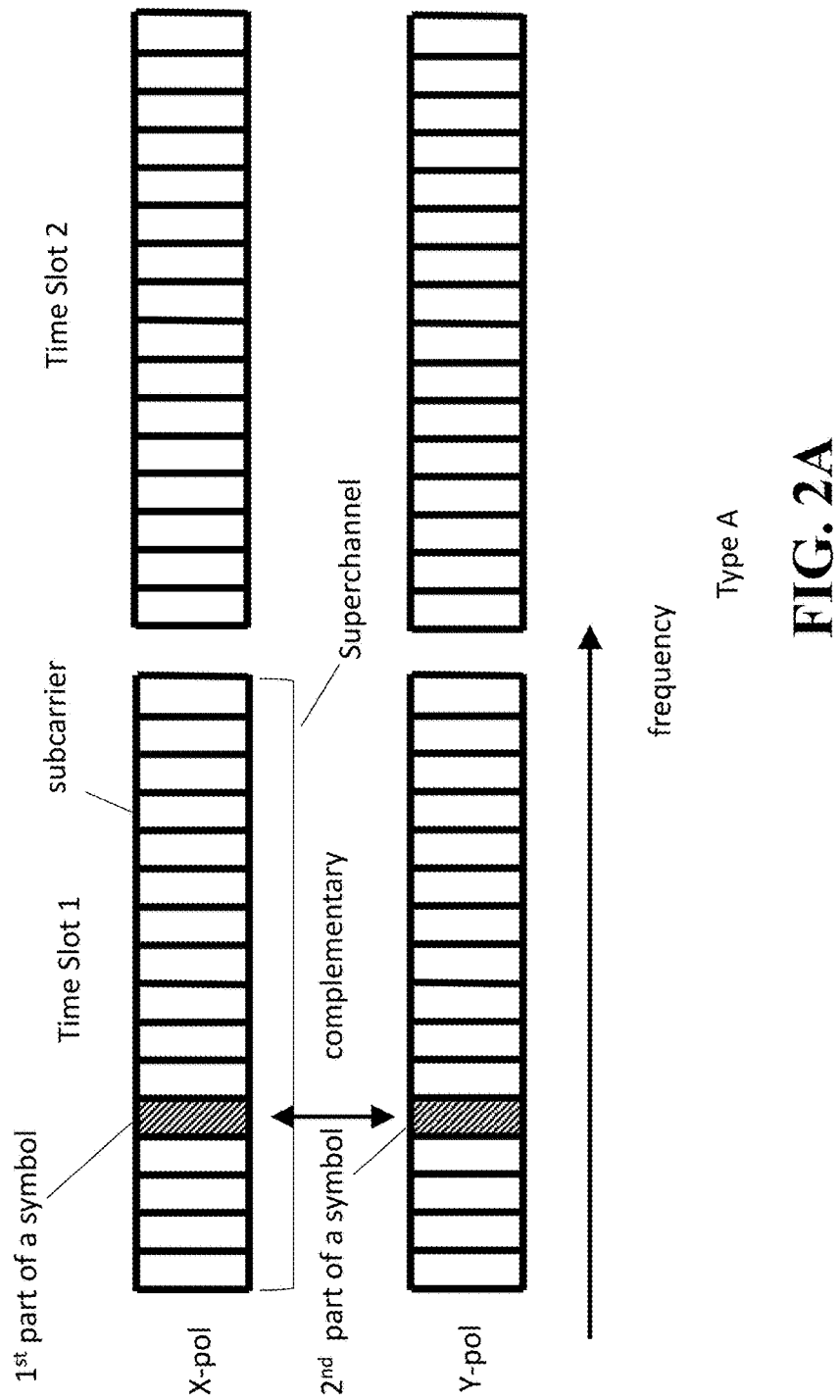
FIG. 2A shows a schematic illustrating a type A of mapping 4D signals with complementary amplitude, using tow polarizations and two time slots, according to embodiments of the invention.
Figure 2B:
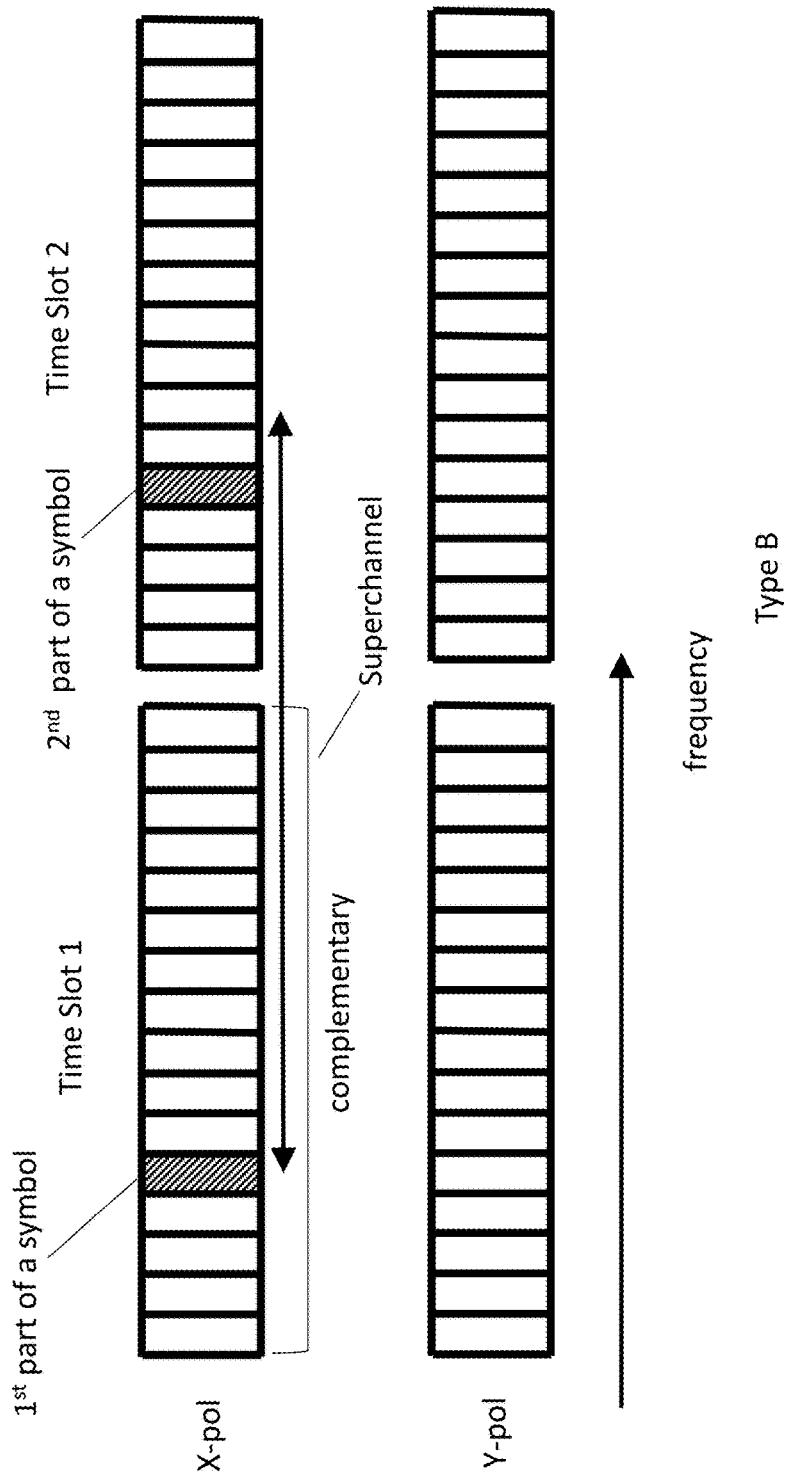
FIG. 2B shows a schematic illustrating a type B of mapping 4D with complementary amplitude, using tow polarizations and two time slots, according to embodiments of the invention.
Figure 2C:
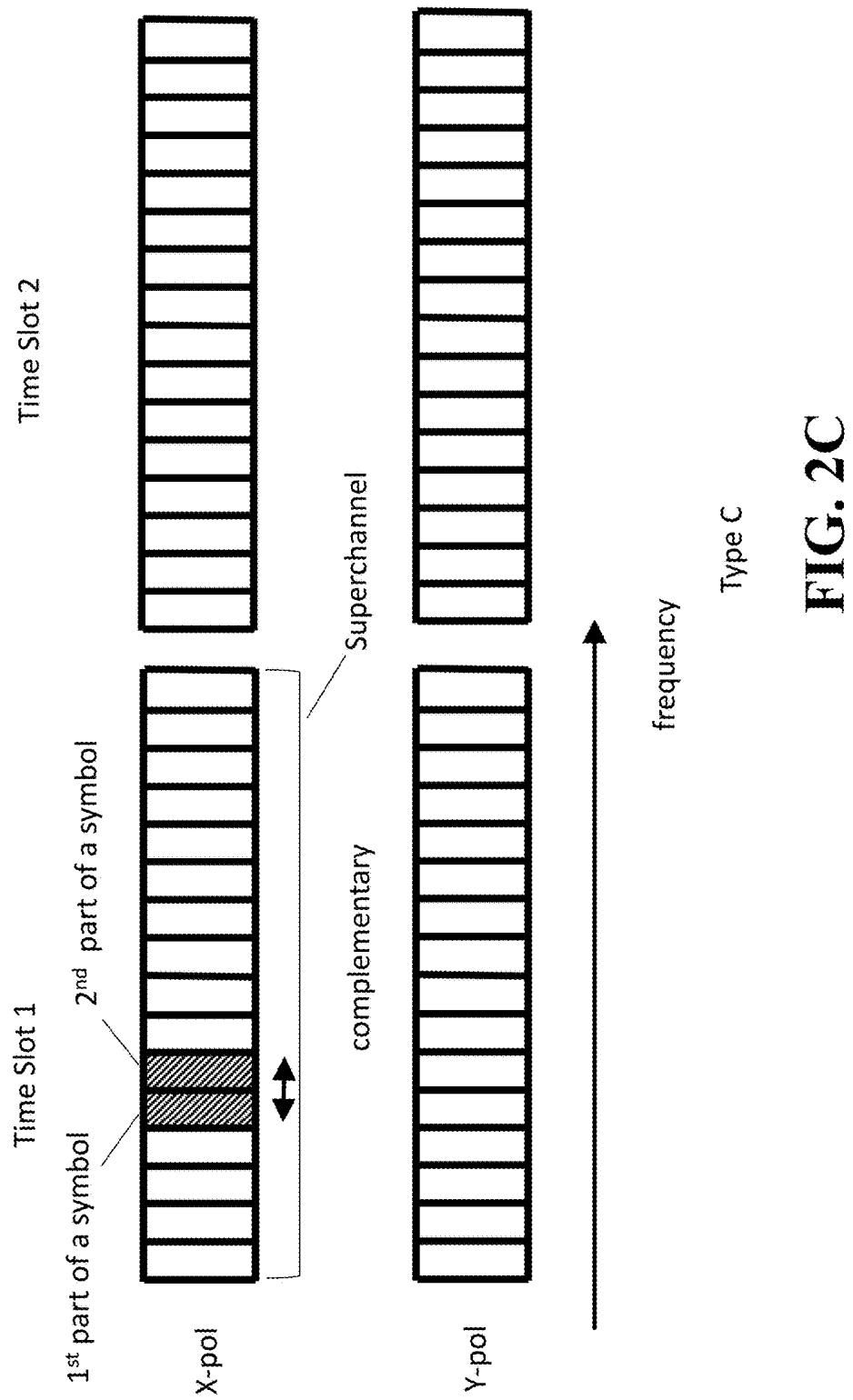
FIG. 2C shows a schematic illustrating a type C of mapping 4D signals with complementary amplitude, using tow polarizations and a time slot with neighboring frequencies (subchannels), according to embodiments of the invention according to embodiments of the invention.

FIGS. 2A-2C show how the 4D signals are mapped to optical signals. In these figures, each time slots consists of two superchannels, allocated to X- and Y-polarizations, respectively. Each superchannel consists of multiple subcarriers, multiplexed in the frequency domain.

FIG. 2A shows the case referred to as Type A, where two parts of a symbol, with complementary amplitude rings, are mapped to the corresponding subcarriers in two polarizations. Even though it is not absolutely necessary to have the exactly the same subcarrier number in each polarization, it is generally advantageous, because they have the same speed of propagation, and they cancel out intensity fluctuations for a longer distance. In this arrangement, the sum of the power of subchannels in two polarization is constant, so self-phase modulation (SPM) and cross-phase modulation (XPM) are strongly suppressed FIG. 2B shows the case referred to as Type B, where two parts of a symbol, with complementary amplitude rings, are mapped to the corresponding subcarriers in two sequential time slots of the same polarization. Just like the previous case, even though it is not absolutely necessary to have the exactly the same subcarrier number in each time slot, it is generally advantageous, because they have the same speed of propagation, and they cancel out intensity fluctuations for a longer distance. The benefit of this mapping type is that the sum of the power of the subchannel over two time slot is constant in each polarization, so the cross polarization modulation (XPolM) is strongly suppressed.

FIG. 2C shows the case referred to as Type C, where two parts of a symbol, with complementary amplitude rings, are mapped to the neighboring subcarriers in the same superchannel. Just like the previous case, even though it is not absolutely necessary to have the neighboring subcarriers in each subcarrier, it is generally advantageous, because they have the closest speed of propagation, and the sum of the power of the two neighboring subcarriers is maintained constant over a long distance, suppressing SPM, XPM, and XPolM overall.

Five Bit-Symbol Modulation Format

A five bits/symbol (5-bits/symbol: a symbol expressed by 5 bits) modulation format is described by use of FIG. 1B and FIG. 1C. The 5-bits/symbol modulation format is performed based on the 4D-2A8PSK modulation format scheme with the Gray-mapped 8-ary phase-shift keying (8PSK) having two amplitude rings arranged on each of the first constellation and second constellation. The amplitude rings Rx1 and Rx2 of the first constellation have circular grids identified by three bits indicating phase angles and radii indicating amplitude values identified by a parity bit as shown in FIG. 1B. Further, the amplitude rings Ry1 and Ry2 of the second constellation have circular grids identified by three bits indicating the phase angles and the radii indicating the amplitude values identified by a parity bit as shown in FIG. 1C.

FIG. 3A also shows a summary of a mapping rule of the 5-bits/symbol modulation format. It should be noted that the bit array {B[0] B[1] B[2] B[3] B[4] B[5] B[6] B[7]} are expressed by {b0 b1 b2 b3 b4 b5 b6 b7} in the figure. As indicated, {b0 b1 b2} and {b3 b4 b5} are Gray mapped phases, and the bit b5 is the additional bit and bits b6 and b7 are parity bits indicating amplitude values. More specific descriptions will be given in the following.

The 5-bit codeword expressed by five information bits of {B[0] B[1] B[2] B[3] B[4]} encoded into an optical data code by mapping a first subset {B[0] B[1] B[2]} on the first constellation and a second subset {B[3] B[4]} on the second constellation based on a five-bit-modulation format according to an embodiment of the invention.

A procedure of mapping the first and second subsets of the 5-bit symbol onto the first constellation and the second constellation is performed by use of eight bits, {B[0] B[1] B[2] B[3] B[4] B[5] B[6] B[7]}.

The eight bits are composed of the five information bits of {B[0] B[1] B[2] B[3] B[4]} and parity bits of {B[5] B[6] B[7]}. The parity bit B[5] is determined by a logical exclusive OR (XOR) operation of the codeword bits {B[0] B[1] B[2]}, which is expressed by $$B[5]=\text{XOR}(B[0],B[1],B[2]). \quad (1)$$

Further, the parity bit B[6] is determined by the following logical operation.

$$B[6]=\text{XOR}(B[2],B[3],B[4]) \quad (2)$$

The parity bits {B[6], B[7]} are configured to be complementary with each other, thus their relation is expressed by $$B[7]=\text{NOT}(B[6]). \quad (3)$$

It is noted that although the additional bit B[5] is created from the first subset of the 5-bit symbol by XOR operation in this example, other combination of bits from the 5-bit symbol may be used according to the design of a modulation format scheme. Further, another logical operation may be performed according to the design of a modulation format scheme.

It is also noted that when obtaining the parity bits B[5] and B[6], the bit B[2] is commonly utilized for the logical XOR operations in equations (2) and (3). In other embodiments, another codeword bit in the 5-bit symbol, such as B[0], B[1], B[3] or B[4] may be selected for the logical operations.

For instance, when the parity bit B[6] is determined to be "0" after the XOR operation of equation (2), the parity bit B[7] becomes "1" according to equation (3), then the first subset{B[0] B[1] B[2]} is arranged onto a grid on the first amplitude ring Rx1 of the first constellation. In this case, the circular grid on the first amplitude ring Rx1 is selected so that the three bits of the circular grid on the first amplitude ring Rx1 correspond to {B[0] B[1] B[2]} of the first subset of the 5-bit symbol. Successively, the second subset {B[3] B[4] B[5]} is arranged onto a grid on the second amplitude ring Ry2 of the second constellation according to the parity bit B[7] indicating "1." In this case, the circular grid on the second amplitude ring Ry2 is selected so that the three bits of the circular grid on the second amplitude ring Ry2 correspond to {B[3] B[4] B[5]} of the second subset. Accordingly, for the 5-bit symbol given, the circular grid on the first amplitude ring Rx1 designates an amplitude value of r1 and a phase angle determined by the three bits {B[0] B[1] B[2] } arranged on the first amplitude ring Rx1, and the circular grid on the second amplitude ring Ry2 designates an amplitude value of r2 and a phase angle determined by the three bits {B[3] B[4] B[5]} arranged on the second amplitude ring Ry2.

In another example, when the parity bit B[6] is determined to be "1" after the XOR operation of equation (2), the parity bit B[7] becomes "0" according to equation (3), then the first subset of {B[0] B[1] B[2]} is arranged onto a grid on the second amplitude ring Rx2 of the first constellation. In this case, the circular grid on the second amplitude ring Rx2 is selected so that the three bits of the circular grid on the second amplitude ring Rx2 correspond to {B[0] B[1] B[2]} of the first subset of the 5-bit symbol. Successively, the second subset {B[3] B[4] B[5]} is arranged onto a grid on the first amplitude ring Ry1 of the second constellation according to the parity bit B[7] indicating "0." In this case, the circular grid on the first amplitude ring Ry1 is selected so that the three bits of the circular grid on the first amplitude ring Ry1 correspond to {B[3] B[4] B[5]} of the second subset.

Figures 4A, 4B:
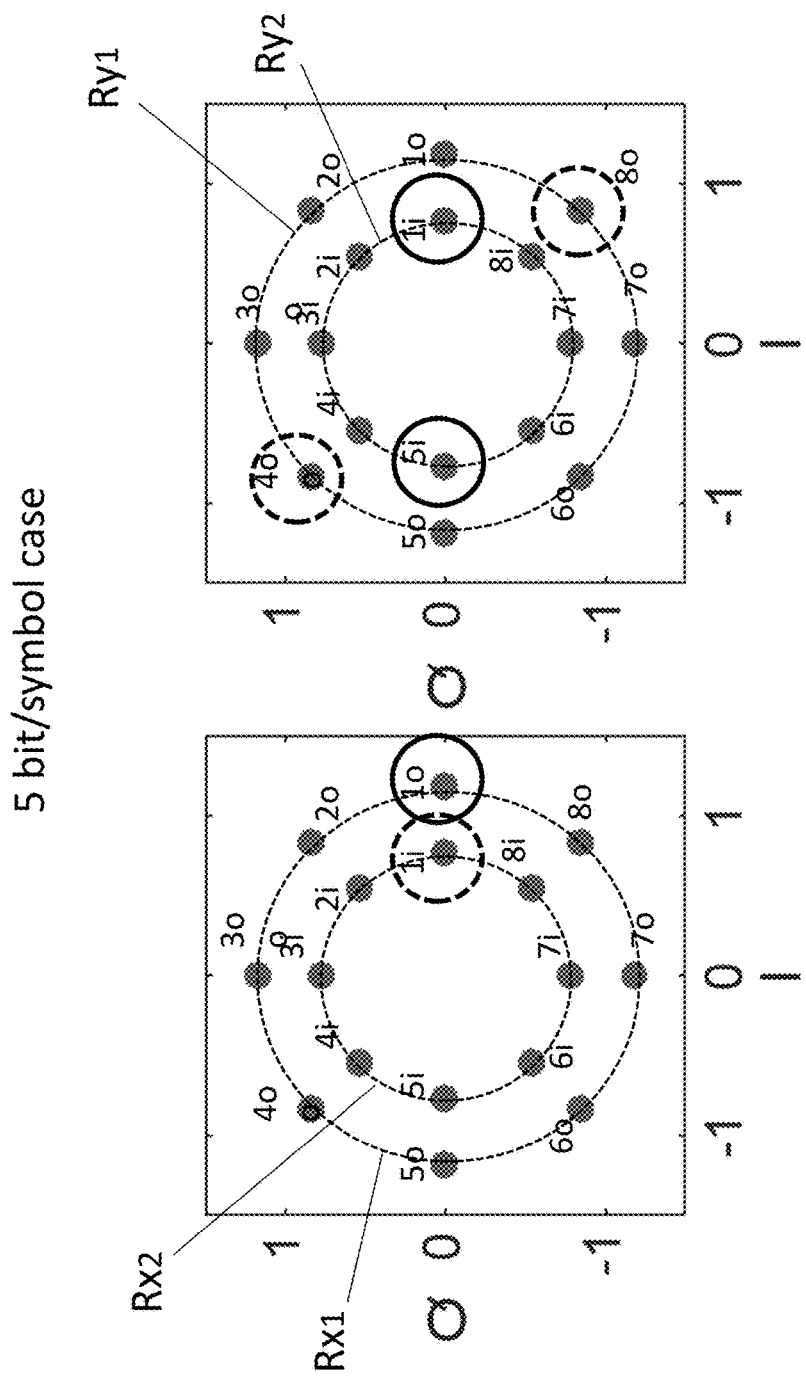
FIG. 4A and FIG. 4B show an example of the 5 bits/symbol modulation format, according to embodiments of the invention.

FIG. 4A and FIG. 4B show an example of the 5 bits/symbol modulation format according to an embodiment of the invention. Addresses "1o" through "8o" and "1i" through "8o" are arranged to circular grids on the amplitude rings Rx1, Rx2, Ry1 and Ry2 instead of three bits {0 0 0} through {1 1 1}.

In this case, when a first subset of a symbol is assigned to a grid (1o) on the ring Rx1 in the first constellation, a second subset of the symbol have two possible circular grids (1i and 5i) to be assigned on the ring Ry2 in the second constellation, and when a first subset of another symbol is assigned to a grid (1i) on the ring Rx2 in the first constellation, then a second subset of the symbol have two circular grids (4o and 8o) to be assigned on the ring Ry1 in the second constellation.

Accordingly, for the 5-bit symbol given, the circular grid on the second amplitude ring Rx2 designates an amplitude value of r2 and a phase angle determined by the three bits {B[0] B[1] B[2]} arranged on the second amplitude ring Rx2, and the circular grid on the first amplitude ring Ry1 designates an amplitude value of r1 and a phase angle determined by the three bits {B[3] B[4] B[5]} arranged on the first amplitude ring Ry1.

Six Bit-Symbol Modulation Format

A six bits/symbol (6-bit symbol: a symbol expressed by 6 bits) modulation format is described by use of FIG. 2A and FIG. 2B in the following. Similarly, to the case of the 5-bits/symbol modulation format, the 6 bits/symbol modulation format is performed based on the 4D-2A8PSK modulation format scheme with the Gray-mapped 8-ary phase-shift keying (8PSK) having two amplitude rings arranged on each of the first constellation and second constellation. The amplitude rings Rx1 and Rx2 of the first constellation have circular grids identified by three bits indicating the phase angles and the radii indicating amplitude values identified by the parity bit as shown in FIG. 2A. Further, the amplitude rings Ry1 and Ry2 of the second constellation have the circular grids identified by three bits indicating phase angles and the radii indicating amplitude values identified by the parity bit as shown in FIG. 2B.

FIG. 3B also shows a summary of a mapping rule of the 6-bits/symbol modulation format. It should be noted that the codeword bits {B[0] B[1] B[2] B[3] B[4] B[5] B[6] B[7]} are expressed by {b0 b1 b2 b3 b4 b5 b6 b7} in the figure. As indicated, {b0 b1 b2} and {b3 b4 b5} are Gray mapped phases, and bits b6 and b7 are parity bits indicating amplitude values. More specific descriptions will be given in the following.

The 6-bit symbol expressed by six information bits of {B[0] B[1] B[2] B[3] B[4] B[5]} is encoded into an optical data code by mapping a first subset {B[0] B[1] B[2]} on the first constellation and a second subset {B[3] B[4] B[5]} on the second constellation based on a six-bit-modulation format according to an embodiment of the invention.

A procedure of mapping the first subset and second subset of the 6-bit symbol onto the first constellation and the second constellation is performed by use of eight bits, {B[0] B[1] B[2] B[3] B[4] B[5] B[6] B[7]}. The eight bits are composed of {B[0] B[1] B[2] B[3] B[4] B[5]} and parity bits {B[6], B[7]}, in which each of the bits is a codeword bit. The codeword bit B[6] is determined by a logical exclusive OR (XOR) operation of the codeword bits {B[0] B[1] B[2] B[3] B[4] B[5]}, expressed as follows.

$$B[6]=\text{XOR}(B[0],B[1],B[2],B[3],B[4],B[5]B[6],B[7]) \quad (4)$$

The parity bits {B[6], B[7]} are configured to be complementary each other, then their relation is expressed by $$B[7]=\text{NOT}(B[6]). \quad (5)$$

For instance, when the codeword bit B[6] is determined to be "0" after the XOR operation of equation (4), the parity bit B[7] becomes "1" according to equation (5), and the first subset of {B[0] B[1] B[2]} is arranged onto a grid on the ring Rx1. In this case, the circular grid on the ring Rx1 is selected so that the three bits on the circular grid on the ring Rx1 correspond to {B[0] B[1] B[2]} of the first subset of the 6-bit symbol. Successively, the second subset of {B[3] B[4] B[5]} is arranged onto a grid on the ring Ry2 according to the parity bit B[7] indicating "1." In this case, the circular grid on the ring Ry2 is selected so that the three bits of the circular grid on the ring Ry2 correspond to {B[3] B[4] B[5]} of the second subset of the 6-bit symbol. Accordingly, each of circular grids on the amplitude rings Rx1, Rx2, Ry1 and Ry2 designates a phase angle and an amplitude value of each subset of the 6-bit symbol.

Figures 5A, 5B:
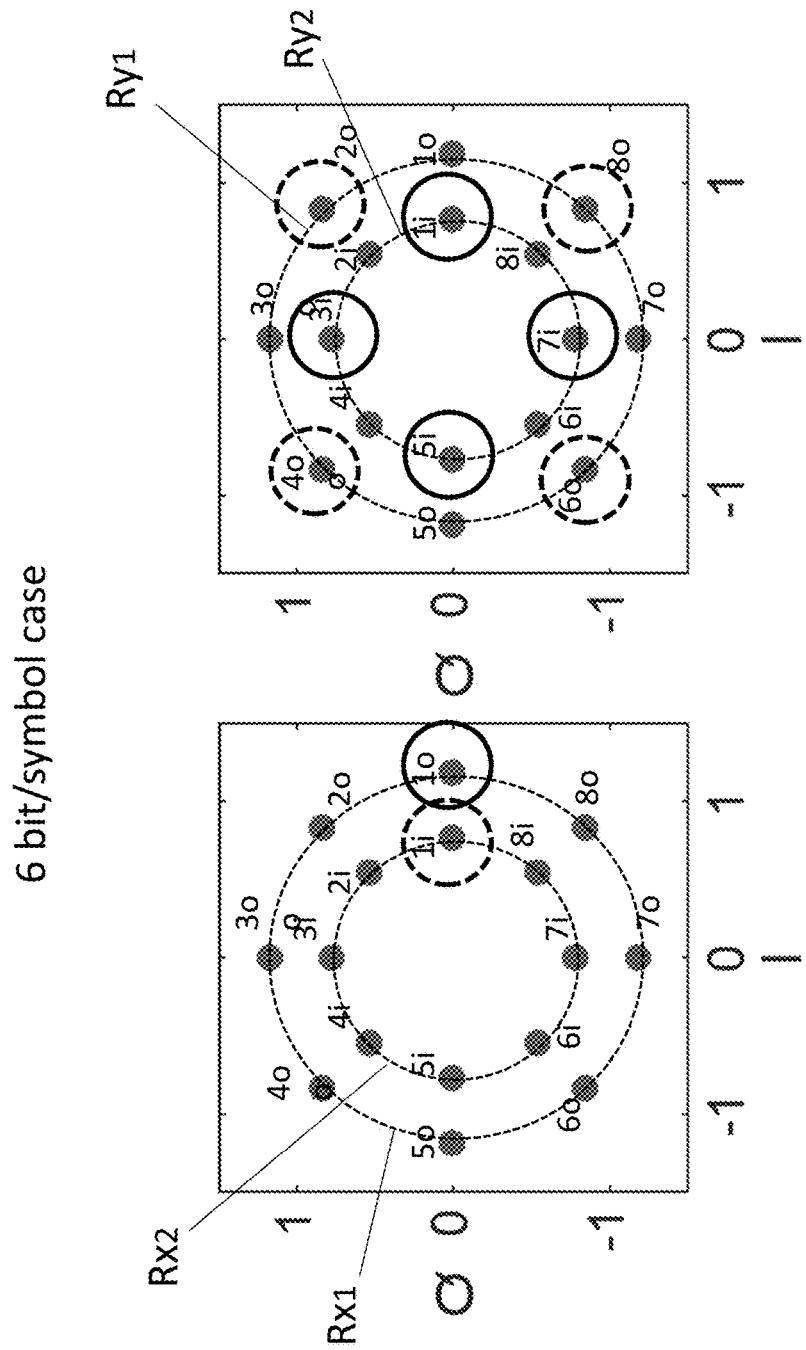
FIG. 5A and FIG. 5B show an example of the 6 bits/symbol modulation format, according to embodiments of the invention.

FIG. 5A and FIG. 5B show an example of the 6 bits/symbol modulation format according to an embodiment of the invention. Grid addresses "1o" through "8o" and "1i" through "8o" are arranged to circular grids on the amplitude rings Rx1, Rx2, Ry1 and Ry2 instead of three bits {0 0 0} through {1 1 1}.

In this case, when a first subset of a symbol is assigned to a grid (1o) on the ring Rx1 in the first constellation, a second subset of the symbol have four possible circular grids (1i, 3i, 5i, and 7i) to be assigned on the ring Ry2 in the second constellation, and when a first subset of another symbol is assigned to a grid (1i) on the ring Rx2 in the first constellation, then a second subset of the symbol have four circular grids (2o, 4o, 6o, and 8o) to be assigned on the ring Ry1 in the second constellation.

Seven Bit-Symbol Modulation Format

FIG. 3C shows a summary of a mapping rule of the 7-bits/symbol modulation format. The seven bits/symbol (7-bit symbol: a symbol expressed by 7 bits) will described in detail in the following.

Similarly, to the cases of the 5-bits/symbol and 6-bits/symbol modulation formats, the 7 bits/symbol modulation format is performed based on the 4D-2A8PSK modulation format scheme with the Gray-mapped 8-ary phase-shift keying (8PSK) having two amplitude rings arranged on each of the first constellation and second constellation. The amplitude rings Rx1 and Rx2 of the first constellation have circular grids identified by three bits indicating the phase angles and the radii indicating amplitude values identified by the parity bit as shown in FIG. 2A. Further, the amplitude rings Ry1 and Ry2 of the second constellation have the circular grids identified by three bits indicating phase angles and the radii indicating amplitude values identified by the parity bit as shown in FIG. 2B.

A 7-bit symbol is expressed by seven information bits of {B[0] B[1] B[2] B[3] B[4] B[5] B[6]}. The 7-bit symbol is partitioned into a first subset {B[0] B[1] B[2] B[3]} and a second subset {B[4] B[5] B[6]}. A parity bit B[7] is created by a logical operation expressed by $$B[7]=\text{NOT}(B[3]). \tag{6}$$

In this case, the first subset {B[0] B[1] B[2] B[3]} is applied to the first constellation by using the bit B[3] as a parity bit of the first subset. The rest of bits {B[0] B[1] B[2]} are used to identify a grid on one of the amplitude rings Rx1 and Rx2 depending on the value of the parity bit B[3]. The second subset {B[4] B[5] B[6]} is applied to the second constellation to identify a grid on one of the amplitude rings Ry1 and Ry2 depending on the value of the parity bit B[7].

For instance, when the codeword bit B[3] of the 7-bit symbol indicates "0," the parity bit B[7] becomes "1" and a grid on the ring Rx1 is selected so that the three bits of the circular grid on the ring Rx1 correspond to first three bits {B[0] B[1] B[2]} of the 7-bit symbol. As a result, the first subset{B[0] B[1] B[2] B[3]} of the 7-bit symbol is encoded to identify an amplitude value indicated by the radius r1 of the ring Rx1 and a phase angle indicated by the circular grid. Further, the second subset {B[4] B[5] B[6]} is applied to select a grid on the ring Ry2 so that the three bits of the circular grid on the ring Ry2 correspond to second three bits {B[3] B[4] B[5]} of the second subset of the 7-bit symbol.

Further, when the codeword bit B[3] of the 7-bit symbol indicates "1," the parity bit B[7] becomes "0" and a grid on the ring Rx2 is selected so that the three bits of the circular grid on the ring Rx2 correspond to first three bits {B[0] B[1] B[2]} of the 7-bit symbol. As a result, the first subset{B[0] B[1] B[2] B[3]} of the 7-bit symbol is encoded to identify an amplitude value indicated by the radius r1 of the ring Rx1 and a phase angle indicated by the circular grid. Further, the second subset {B[4] B[5] B[6]} is applied to select a grid on the ring Ry2 so that the three bits of the circular grid on the ring Ry2 correspond to the second three bits {B[3] B[4] B[5]} of the second subset of the 7-bit symbol.

FIG. 6A and FIG. 6B show an example of the 7 bits/symbol modulation format according to an embodiment of the invention. Grid addresses "1o" through "8o" and "1i" through "8o" are arranged at circular grids on the amplitude rings Rx1, Rx2, Ry1 and R2 instead of three bits {0 0 0} through {1 1 1}.

In this case, when a first subset of a symbol is assigned to a grid (1o) on the ring Rx1 in the first constellation, then a second subset can be assigned to all possible circular grids (1i-8i) on the ring Ry2 in the second constellation.

Figures 7A, 7B:
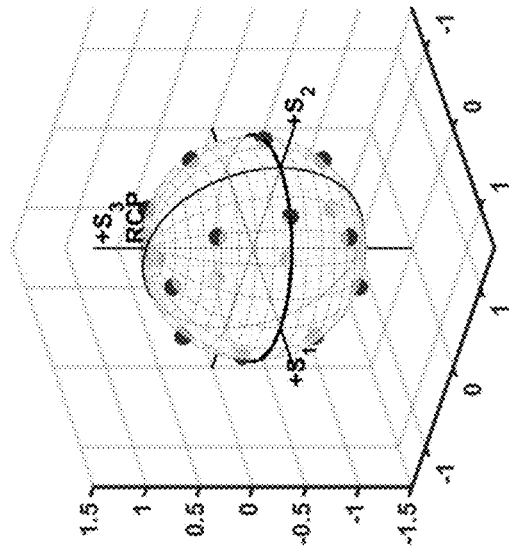
FIG. 7A shows Stocks space representations of the 5B4D-2A8PSK, according to embodiments of the present invention.
FIG. 7B shows Stocks space representations of the 7B4D-2A8PSK, according to embodiments of the present invention.

FIG. 7A and FIG. 7B show Stocks space representations of the 5B4D-2A8PSK and the 7B4D-2A8PSK. In both formats, signal codes are arranged on the surface f the Stokes sphere, which indicate that the total power over used on the communication over the 5B4D-2A8PSK and the 7B4D-2A8PSK are constant.

Fiber nonlinearity is usually the limiting factor in determining the transmission distance of optical communications. One of the ways to mitigate fiber nonlinearity is to use multi-subcarrier (MSC) modulation. It has been theoretically and experimentally demonstrated that MSC modulation comprising of 2-4 GBd subcarriers based on conventional quadrature amplitude modulation (QAM) format is the best in terms of nonlinearity tolerance. This is due to the fact that coherence among subcarriers decreases with narrower subcarrier bandwidth. Therefore, nonlinearity caused by cross-phase modulation (XPM) and cross polarization modulation (XPolM) can be significantly reduced. At the same time, more channels enhance four wave mixing (FWM) effect. Therefore, there is an optimal subcarrier baud rate of 2-4 GBd.

The advantages of 4D-2A8PSK family are three-folds; (1) excellent signal-to-noise (SNR) characteristics under additive Gaussian white noise (AWGN) conditions (i.e., linear performance), (2) excellent nonlinear transmission characteristics, and (3) multiple modulation formats with different spectral efficiency. The case is a special case of channel mapping type A described earlier, and the number of subcarrier is 1. All of the advantages above are carried over to the MSC modulation cases.

Figure 8:
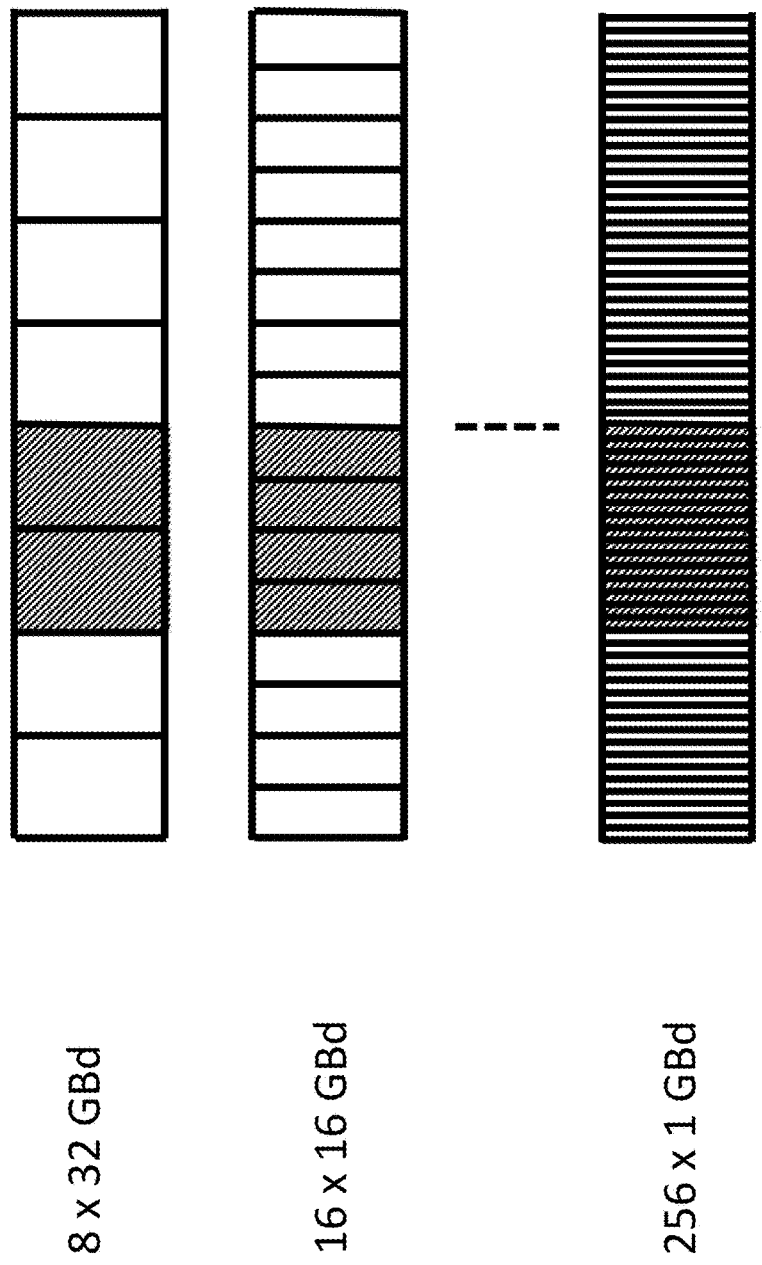
FIG. 8 shows schematics illustrating multi-subcarrier modulation configurations, according to embodiments of the present invention.

Simulation using a link of 50 spans of 80 km standard single mode fiber (SSMF) is conducted. FIG. 8 shows schematics illustrating multi-subcarrier modulation configurations, according to embodiments of the present invention. Each subcarrier is modulated with 32, 16, . . . , 1 GBd and a root raised cosine (RRC) filter with a roll-off parameter of 0.01. Subcarrier channel spacing is 1.01 times the baud rate. The total number of subcarriers is chosen such that the total bandwidth is identical. In this case, GMI is averaged over the shaded area. We fixed the total bandwidth of each subcarrier. The shaded subcarriers near the center were used for calculating the generalized mutual information (GMI), which is nearly equal to an alternative way of expressing bit error ratio (BER).

Figure 9:
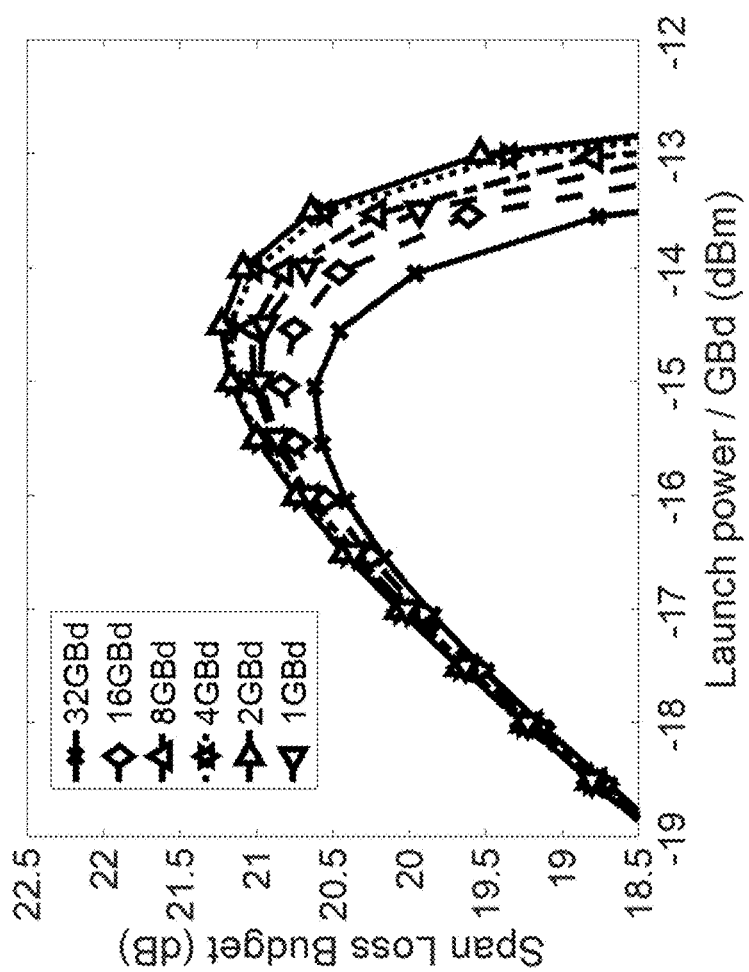
FIG. 9 shows the simulated results of span loss budget as a function of launch power per each subcarrier, according to embodiments of the present invention.

FIG. 9 shows the simulated results of span loss budget (how much optical budget is allowed for each span) as a function of launch power per each subcarrier, when Star-8QAM is used for each subcarrier. As the launch power increases, the span loss budget saturates, due to fiber nonlinearity. However, as the baud rate decreases, the peak span loss budget increases, due to the MCS effect.

Figure 10:
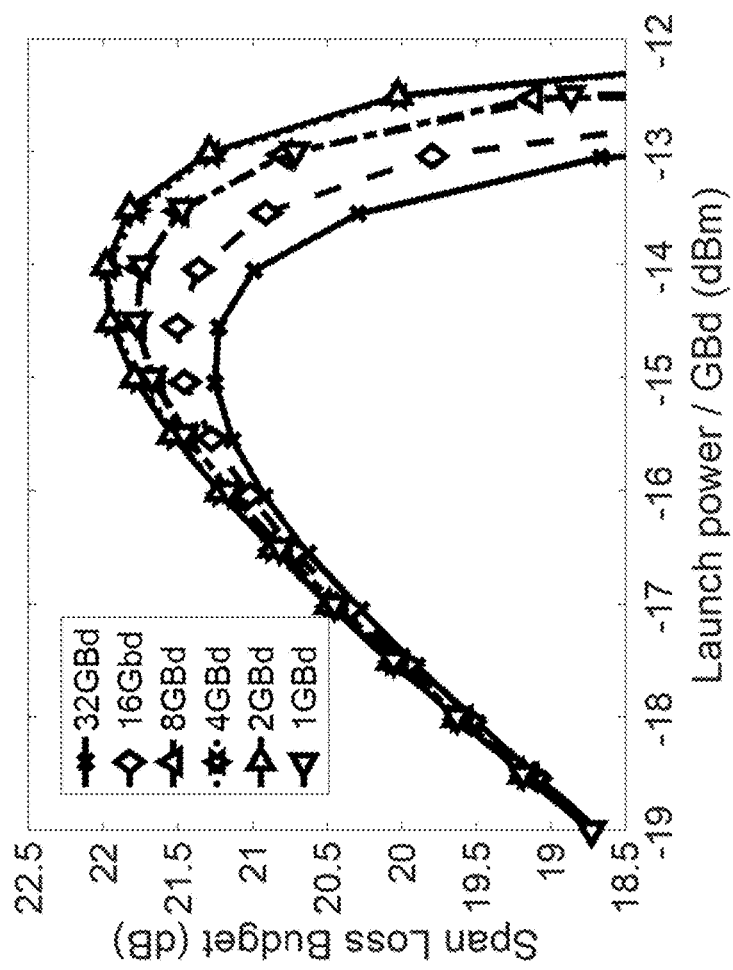
FIG. 10 shows the simulated results of span loss budget as a function of launch power per each subcarrier, according to embodiments of the present invention.

FIG. 10 shows the simulated results of span loss budget (how much optical budget is allowed for each span) as a function of launch power per each subcarrier, when 6b4D-2A8PSK (option A) is used for a pair of subcarriers across two polarizations. Compared to the Star-8QAM cases, 6b4D-2A8PSK shows much higher peak span loss budget, due to the 4D constant modulus property.

Figure 11:
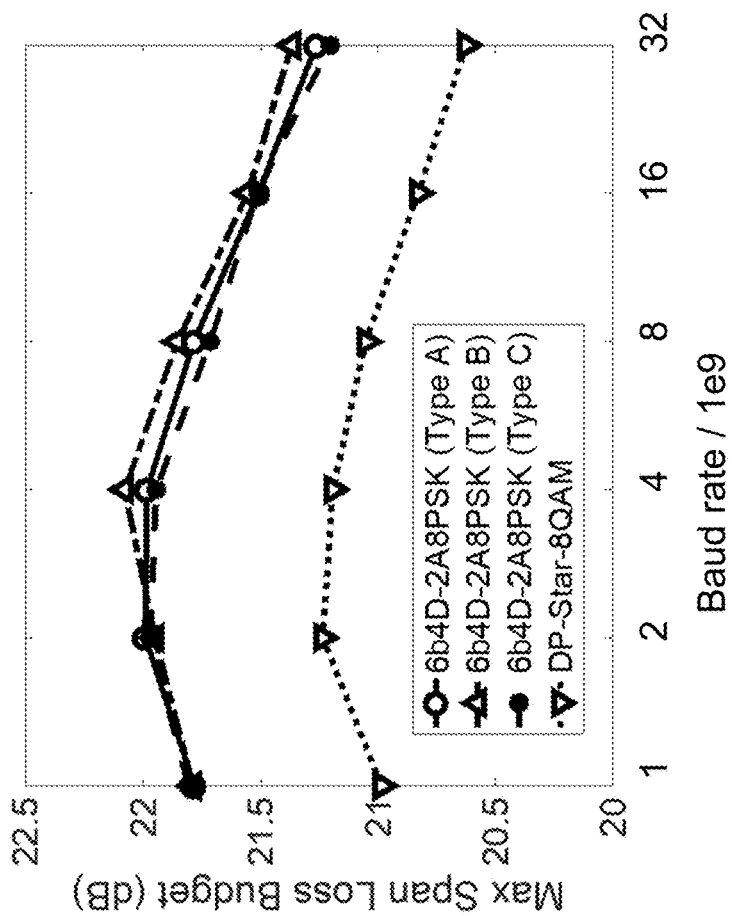
FIG. 11 shows the peak span loss budget of the three mapping types of the 4D constant modulus format and a conventional format as a function of the baud rate.

FIG. 11 shows the peak span loss budget as a function of the baud rate. Here, we compared Star-8QAM and three mapping types of 6b4D-2A8PSK. Overall, all the mapping types of 6b4D-2A8PSK give significantly higher than the Star-8QAM case. This clearly shows the advantage of using 6b4D-2A8PSK as the constituent of each subcarrier. In some cases, the subcarrier baud rate may be in a range between 1 GBd and 100 GBd or between 1 GBd and 32 GBd. In addition, the benefit of 6b4D-2A8PSK becomes higher when the subcarrier baud rate is in a range between 1 GBd and 5 GBd. Further, in some cases, the subcarrier baud rate may be in a range between 2 GBd and 4 GBd. The fact that the three mapping types of 6b4D-2A8PSK show almost equally good results indicate there is enough flexibility in how we map the symbols to subcarriers, when it is actually implemented.

The relative performance difference depends on the fiber plant characteristics. For example, when the two constellations are mapped to two polarizations of the same time slot (Type A), self-phase modulation (SPM) and XPM are strongly suppressed, while XPolM is not. On the other hand, when the two constellations are mapped to two time slots of the same polarization (Type B), the power of each polarization is constant when averaged over two time slots. This strongly suppresses XPolM, while SPM and XPM are not necessarily suppressed. Therefore, if the fiber plan has strong XPolM, it is beneficial to choose Type B. If the system is reconfigurable and can select one of the mapping types according to the fiber plant characteristics, further performance improvement is obtained.

The modulation format does not have to be identical over the superchannel. Modulation formats can have different spectral efficiency. Alternatively, modulation format can be time hybrid, i.e., different modulation formats can be multiplexed in time domain.

In the simulation, we chose the ratio of the two radii to be 0.65, which is near optimal for nonlinear transmission characteristics. Generally, it is chosen between 0.5 and 0.8 to balance between minimizing fluctuation of two power levels and maximizing Euclidean distance.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. An encoder for generating an optical data code from a symbol comprising:
    a processor to perform a symbol mapping program and an encoding program;
    a memory, in connection with the processor, to store the symbol mapping and encoding programs, wherein the symbol mapping program causes the processor to perform:
    providing a first constellation format having first and second amplitude rings with circular grids corresponding to phase angles;
    providing a second constellation format having the first and second amplitude rings with the circular grids corresponding to the phase angles;
    applying a first part of the symbol to one of the first and second constellation formats to represent the first part of the symbol by one of the first and second amplitude rings with one of the circular grids;
    applying a second part of the symbol to another one of the first and second constellation formats to represent the second part of the symbol by one of the first and second amplitude rings with one of the circular grids; and
    providing pairs of superchannels arranged according to time slots, wherein each of the superchannels includes subcarriers allocated to subchannel numbers, wherein the first and second parts of the symbol are allocated to a pair of the subcarriers, wherein a sum of powers of the pair of the subcarriers is chosen so as to become approximately a predetermined value, wherein each of the superchannels is uniformly divided by the subcarriers corresponding to subcarrier symbol rates, and
    wherein the encode program causes the processor to perform:
    encoding the first part of the symbol into a first subset of the optical data code using the one of the first and second amplitude rings with the one of the circular grids according to the one of the first and second constellation formats; and
    encoding the second part of the symbol into a second subset of the optical data code using the one of the first and second amplitude rings with the one of the circular grids according to the other one of the first and second constellation formats.

2. The encoder of claim 1, wherein each pair of the superchannels consists of a first part and a second part, wherein the first part of the pair is allocated to the first constellation format and the second part of the pair is allocated to the second constellation format.

3. The encoder of claim 2, wherein the first part of the symbol is allocated to the first subchannel number of the first part of the pair, wherein the second part of the symbol is allocated to the second subchannel number of the second part of the pair, wherein the first subchannel number is identical to the second subchannel number.

4. The encoder of claim 1, wherein a ratio of radii of the first and second amplitude rings is set in a range between 0.5 and 0.8.

5. The encoder of claim 1, wherein the first and second parts of the symbol are arranged in at least one of the superchannels.

6. The encoder of claim 1, wherein each of the subcarrier symbol rates is in a range between 1 Giga baud-rate (GBd) and 100 GBd.

7. The encoder of claim 1, wherein the first and second parts of the symbol are arranged into an identical one of the superchannels, wherein the first and second parts of the symbol are arranged to two subcarriers of the identical one of the superchannels such that the two subcarriers are apart via a predetermined number of the subcarriers.

8. The encoder of claim 7, wherein the predetermined number is zero.

9. The encoder of claim 1, wherein the first and second parts of the symbol are respectively allocated to a first subchannel number and a second subchannel number of consecutive first and second superchannels, wherein both of the first and second superchannels belong to one of the first and second parts of the pair, wherein the first subchannel number is identical to the second subchannel number.

10. The encoder of claim 1, wherein when the first constellation format is an X-polarization constellation and the second constellation format is a Y-polarization constellation, wherein when the first constellation format is the Y-polarization constellation and the second constellation format is the X-polarization constellation.

11. The encoder of claim 10, wherein a total number of the subcarriers per polarization and a time slot is one.

12. The encoder of claim 1, wherein the first and second constellation formats are represented by a 6 bits-4-dimensional coded modulation format.

13. The encoder of claim 1, wherein the first and second constellation formats are represented by a 7 bits-4-dimensional coded modulation format.

14. The encoder of claim 1, wherein the first and second constellation formats are represented by multiple four-dimensional constant modulus formats.

15. The encode of claim 1, wherein the mapping of the first and second constellation formats is reconfigurable and can be selected depending on the fiber transmission characteristics.

16. An optical transmitter comprising:
   an encoder device of claim 1 configured to generate and transmit first and second modulation signals;
   a continuous wave (CW) optical source configured to transmit a CW optical signal;
   a polarization beam splitter configured to split the CW optical signal of the CW optical source into first and second parts of the CW optical signal;
   a first modulator connected to the encoder device, wherein the first modulator receives and modulates the first part of the CW optical signal to generate a first modulated optical carrier signal according to the first modulation signal;
   a second modulator connected to the encoder device, wherein the second modulator receives and modulates the second part of the CW optical signal to generate a second modulated optical carrier signal according to the second modulation signal; and
   a beam combiner configured to combine the first and second modulated optical carrier signals to generate and transmit a modulated optical carrier signal.

17. The optical transmitter of claim 16, wherein each pair of the superchannels consists of a first part and a second part, wherein the first part of the pair is allocated to the first constellation format and the second part of the pair is allocated to the second constellation format.

18. The optical transmitter of claim 17, wherein the first part of the symbol is allocated to the first subchannel number of the first part of the pair, wherein the second part of the symbol is allocated to the second subchannel number of the second part of the pair, wherein the first subchannel number is identical to the second subchannel number.

19. The optical transmitter of claim 16, wherein the first and second parts of the symbol are arranged into an identical one of the superchannels, wherein the first and second parts of the symbol are arranged to two subcarriers of the identical one of the superchannels such that the two subcarriers are apart via a predetermined number of the subcarriers.

20. The optical transmitter of claim 16, wherein the first part of the symbol is allocated to the first subchannel number of the first part of the pair, wherein the second part of the symbol is allocated to the second subchannel number of the second part of the pair, wherein the first subchannel number is identical to the second subchannel number.

21. The optical transmitter of claim 16, wherein when the first constellation format is based on an X-polarization constellation and the second constellation format is based on a Y-polarization constellation, wherein the first constellation format is based on the Y-polarization constellation and the second constellation format is based on the X-polarization constellation.

* * * * *